United States Patent
Decker

[15] 3,681,980
[45] Aug. 8, 1972

[54] OSCILLATING DISK RHEOMETER

[72] Inventor: George E. Decker, McLean, Va.

[73] Assignee: Monsanto Company, St. Louis, Mo.

[22] Filed: Aug. 26, 1970

[21] Appl. No.: 67,279

Related U.S. Application Data

[63] Continuation of Ser. No. 282,527, May 6, 1963, abandoned, which is a continuation-in-part of Ser. No. 231,428, Oct. 18, 1962, abandoned.

[52] U.S. Cl. .................................. 73/101, 73/15.6
[51] Int. Cl. ............................................. G01n 3/32
[58] Field of Search.....73/59, 60, 15.6, 101, 99, 103; 324/88; 64/14

[56] References Cited

UNITED STATES PATENTS

3,182,494 5/1965 Beatty et al. ............. 73/15.6 X
2,948,147 8/1960 Roelig .......................... 73/89

*Primary Examiner*—Jerry W. Myracle
*Attorney*—Richard O. Zerbe, Neal E. Willis and J. E. Maurer

[57] ABSTRACT

Method and apparatus for determining the rheological properties of an elastomer which method comprises subjecting a sample of the elastomer enclosed under pressure in a non-circular chamber, the base of which is star-shaped or rectangular, to oscillating shearing stress and measuring the stress. Dynamic properties are determined by enclosing a sample of the elastomer under pressure in a chamber, subjecting it to oscillating shearing stress at high frequency to provide measurable difference in phase between stress and displacement, measuring the torque required to impose the shearing stress and simultaneously measuring displacement.

11 Claims, 9 Drawing Figures

Fig. 1

INVENTOR.
GEORGE E. DECKER
BY Richard O. Zerbe

INVENTOR.
GEORGE E. DECKER
BY Richard O. Zerbe

OSCILLATING DISK RHEOMETER

This application is a continuation of application Ser. No. 282,527 filed May 6, 1963 now abandoned, a continuation in part of application Ser. No. 231,428 filed Oct. 18, 1962 now abandoned.

This invention relates to a measuring apparatus for determining the properties of plastic materials and especially for measuring the complete curing characteristics and dynamic properties of elastomers during vulcanization.

Methods for determining the state of cure of rubbers have been the subject of extensive investigations. The classical methods are generally based upon physical properties of separate rubber specimens vulcanized to different states of cure. These techniques are disadvantageous in requiring the testing of a large number of individually prepared samples.

Instruments have been devised for continuously recording the change in stiffness of a rubber specimen throughout vulcanization but they have the disadvantage that the rubber is not maintained under pressure during vulcanization. This results in blowing, flowing and oxidation of the specimen during vulcanization so that no real significance can be attached to modulus values. Other instruments are known which determine the compression modulus throughout vulcanization of the rubber specimen under pressure but they fail to provide a measure of the dynamic properties. The Mooney viscometer [Mooney, M., Ind. Eng. Chem. (Anal. Ed.) 6, 147 (1934)], widely used to determine scorch, is not applicable to the direct examination of curing characteristics except at very early states of cure.

The present invention provides a single instrument which measures the complete curing characteristics and dynamic properties of a single test specimen maintained under pressure continuously throughout vulcanization. In essence, it comprises a forced oscillator embedded in a constant volume of plastic material under pressure. Insertion and removal of the sample is provided for by relatively movable stator sections closing about the oscillator. The oscillator moves through a small arc while the specimen is heated and maintained under pressure thereby subjecting the plastic material to the shearing action of the oscillator. Both stress and strain are measured by appropriate transducers. Stress is determined by means for indicating the torque required to apply the shearing stress and strain is determined by means provided simultaneously to measure the oscillatory displacement motion. Provisions are made for changing both frequency and strain. This instrument provides a convenient tool for determining the scorch time, curing rate, time to optimum cure and change in dynamic properties of a rubber specimen.

Figure 1:
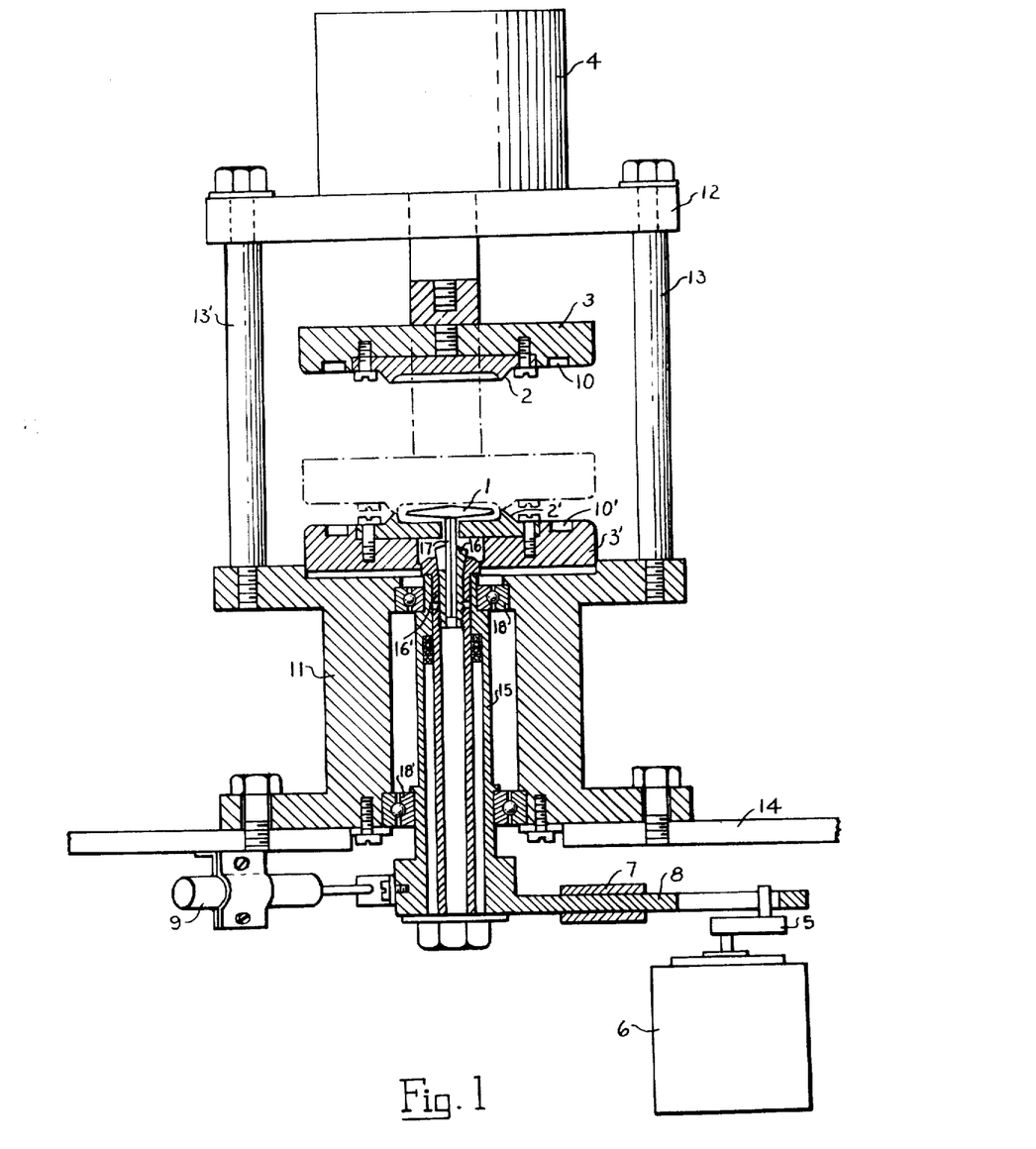
FIG. 1 is essentially a cross-sectional view of the apparatus including pictorial representations of some associated features.

A vertical cross sectional view through the center of the rheometer is shown in FIG. 1. A sinusoidly oscillating disk 1 oscillates through a small angle as for example, 2°. Provision is made for varying the amplitude from 1° to 6°. The upper and lower dies 2 and 2' form the test chamber and are mounted on metal platens 3 and 3' which may be aluminum. The platens are maintained at a specified temperature within a tolerance of ±1°F. by means of a temperature controller not shown. The cavity may be opened for insertion and for removal of the test specimen but is held closed during the test by air cylinder 4. An 8 inch air cylinder is a convenient size where the pressure is 50–60 pounds per square inch. The size of the test specimens can vary, but may conveniently comprise two disks approximately one-fourth inch in thickness and 1¾ inches in diameter. If the modulus of the cured stock exceeds certain limiting values depending upon the composition of the test material, circular shape is unsatisfactory.

For example, to obtain meaningful numbers above about 1,500 psi in the case of a typical natural rubber tread stock containing 50 parts by weight of carbon black it was necessary to employ a non-circular test specimen designed to prevent free rotation of the sample. Rubber shrinks during cure and slippage of the rubber specimen may occur in a circular test chamber when the stress becomes sufficiently high. Whatever the explanation, a test chamber with a square base or other shape designed to prevent slippage of the sample by variation from a perfect circle avoided the plateau of modulus values observed with circular chambers. It is desirable to have as large a ratio of cavity size to rotor size as is feasible, but of course there are practical limits to cavity size. As cavity size increases the instrument becomes too bulky and requires too much test sample for practical consideration. As the rotor size is reduced a point is reached where the signals become too weak for satisfactory measurement.

The oscillating motion of the disk may be imparted by an eccentric 5 which may be driven by a variable speed motor 6. The torque required to oscillate the disk and thus to apply shearing stress to the rubber specimen is measured by a stress transducer 7 comprising strain gauges bonded to the lever 8 which connects the disk to the eccentric. Baldwin SR-4 strain gauges are convenient for building the stress transducers to convert stress into an electrical signal. The oscillatory displacement motion of the disk is measured simultaneously by a differential transformer 9. This converts the mechanical strain into an electrical signal.

The metal platens 3 and 3' contain circular heating elements 10 and 10'. Exemplary dimensions are 9 inch diameter metal platens, ⅜ inch depth of the cavities containing the heating elements and the dies and 4 inch diameter of the die cavity. The lower metal platen rests on housing element 11 held in fixed relation to cylinder adapter plate 12 by supporting rods 13 and 13'. The housing in turn rests on the base plate 14. The shaft 15 contains the collet and draw bar assembly 16 and 16'. The disk is securely fastened to the shaft by the collet and draw bar assembly. The spindle of the disk 17 and the collet opening are preferably square to aid in eliminating slipping and play in the oscillating cycle. Friction of the shaft during oscillation is reduced by ball bearings 18 and 18'.

The torque measuring device may be calibrated by dead weight loading, the slight distortion of the lever being picked up by the sensitive strain gauges. The sinusoidal signals from the two transducers are preferably amplified and fed to appropriate data presentation devices. For example, dynamic properties at the higher frequencies may be determined by recording simultaneously the stress and strain signals on an oscillograph and the stress-strain ellipse presented on an oscilloscope. The dynamic modulus may be determined in known manner from the stress (actually torque) recorded on the oscillograph. The strain imparted by the oscillating movement could be represented as a sine wave. The resulting stress also has the characteristics of the sine wave but differs in phase. The difference in phase, which difference is known as the loss angle, may be determined by varying the resistance in a calibrated resistance-capacitance phase shift network located between the stress signal and the oscilloscope until the stress and strain signals are inphase as indicated by coincidence of the stress and strain tracings. Under this condition the ellipse becomes a straight line. Loss angles as low as a few degrees can be measured with a precision of ± 0.2°. The real and imaginary parts of the complex dynamic modulus can be calculated from the loss angle and the dynamic loss values in known manner. Payne, A.R., and Scott, J.R., "Engineering Design With Rubber," Interscience Publishers, Inc., New York 1960, Chapter 2. In essence this involves solution of a right triangle in a vector diagram where the measured torque is the resultant, the side opposite the phase angle is the viscous component and the adjacent side the elastic component of the modulus.

Figure 2:
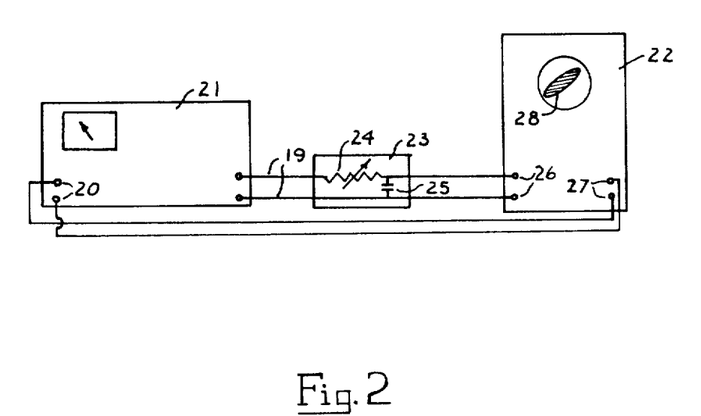
FIG. 2 is a schematic representation of a system for treating the signals from the apparatus to determine phase angle.

From subjecting a fixed volume of elastomer to shearing stress imparted by an oscillator the phase angle may be determined as explained above by continuously measuring torque required to move the oscillator, simultaneously therewith continuously measuring displacement of the oscillator and measuring the shift in phase required to bring the torque signal into phase with the strain signal. The preferred method of determining the phase angle is illustrated in more detail in FIG. 2. The stress signal 19 and the strain signal 20 from the amplifier 21 are connected to an oscilloscope 22. However, the stress signal is connected through a calibrated resistance-capacitance phase-shift network 23 comprising variable resistor 24 and capacitor 25. At the oscilloscope, one set of terminals receives the stress signal input 26 and a second set of terminals receives the strain signal input 27. After starting the oscillator the phase-shift network is adjusted until the ellipse 28 which appears on the oscilloscope collapses into a straight line. A single line is maintained on the oscilloscope by continual adjustment of the phase-shift network throughout the run. The phase angle may be read directly from the calibration curve relating dial readings of the phase-shift network to phase angle. The calibration is of course calculated in known manner from the frequency, resistance and capacitance.

The machine is loaded by removing the disk from the cavity, inserting the spindle through the center of one test piece and replacing the disk. The second test piece is placed on the top of the disk and the dies closed, forcing the rubber to surround the disk and completely fill the cavity. The oscillatory speed of the disk may be varied widely depending upon the purpose of the study. In service different rubber articles may be subjected to much different rates of dynamic stress. In general frequencies up to 3,600 cycles per minute comprise the range of usual interest but this is not to be taken as limitative. As an example of operation to measure dynamic properties the disk was oscillated over 2° arc at a frequency of 852 cycles per minute (14.2 cycles per second) and to measure curing characteristics it was oscillated at 1 cycle per minute over the same arc. The amplified stress signal may be recorded on a conventional strip chart recorder, not shown. The actual experimental record of the strip chart will relate stiffness in inch pounds of torque to time in minutes. From such a record chart at the lower frequency the usual curing parameters of a rubber stock such as scorch time, induction time, curing rate, optimum cure and reversion characteristics may be easily determined. At this low frequency the effect of the viscous component of the rubber is minimized. The phase-shift network is unnecessary.

Figure 3:
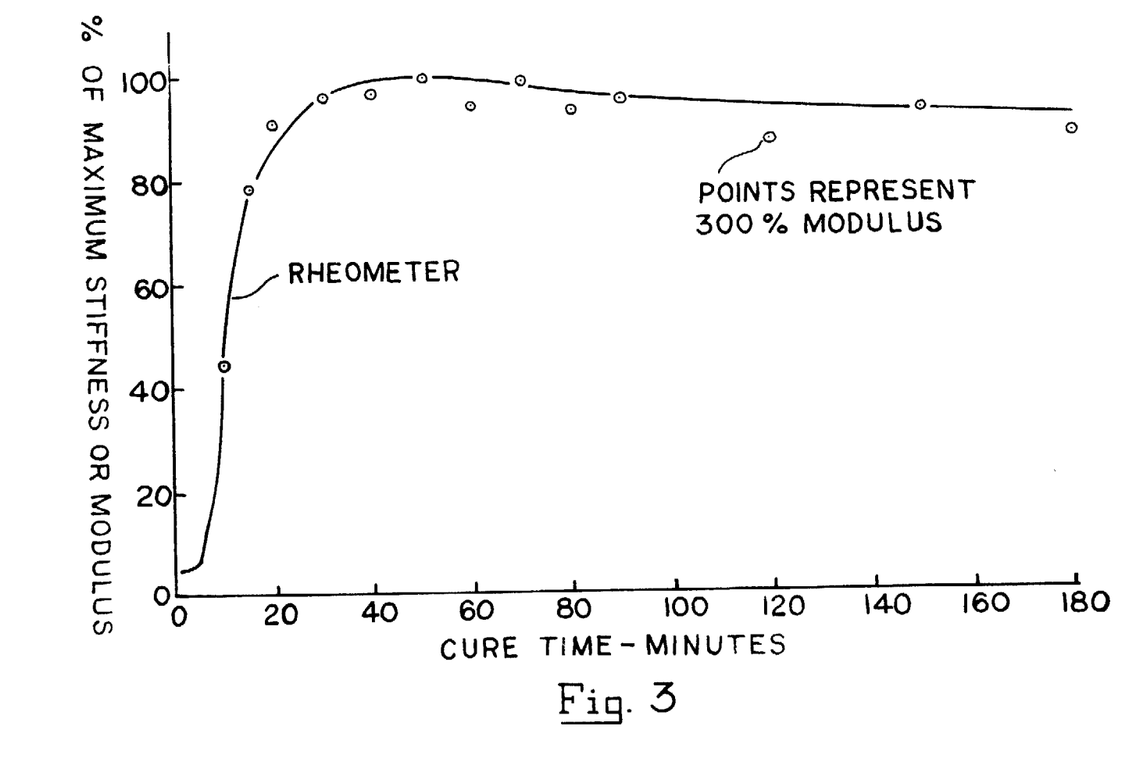
FIG. 3 is a graph which illustrates the agreement between rheometer stiffness data and stress-strain data obtained by conventional means.

Excellent agreement of rheometer stiffness data with stress-strain data is demonstrated by FIG. 3. In this figure a plot of continuous rheometer stiffness obtained at a frequency of 1 cycle per minute at 144°C. and 300 percent modulus values obtained at various cure times on a sulfenamide accelerated natural rubber tread stock are compared. For purposes of comparison both the rheometer and stress-strain data in FIG. 3 are in terms of percent of their respective maximum stiffness or moduli. It will be appreciated that the usual vulcanization parameter may be completely determined from a single rheometer run whereas to determine these parameters completely by the usual techniques it is common practice to use a combination of stress-strain and Mooney viscosity data. The advantage of a single instrument and test procedure for determining all of the desired parameters is obvious.

Figure 4:
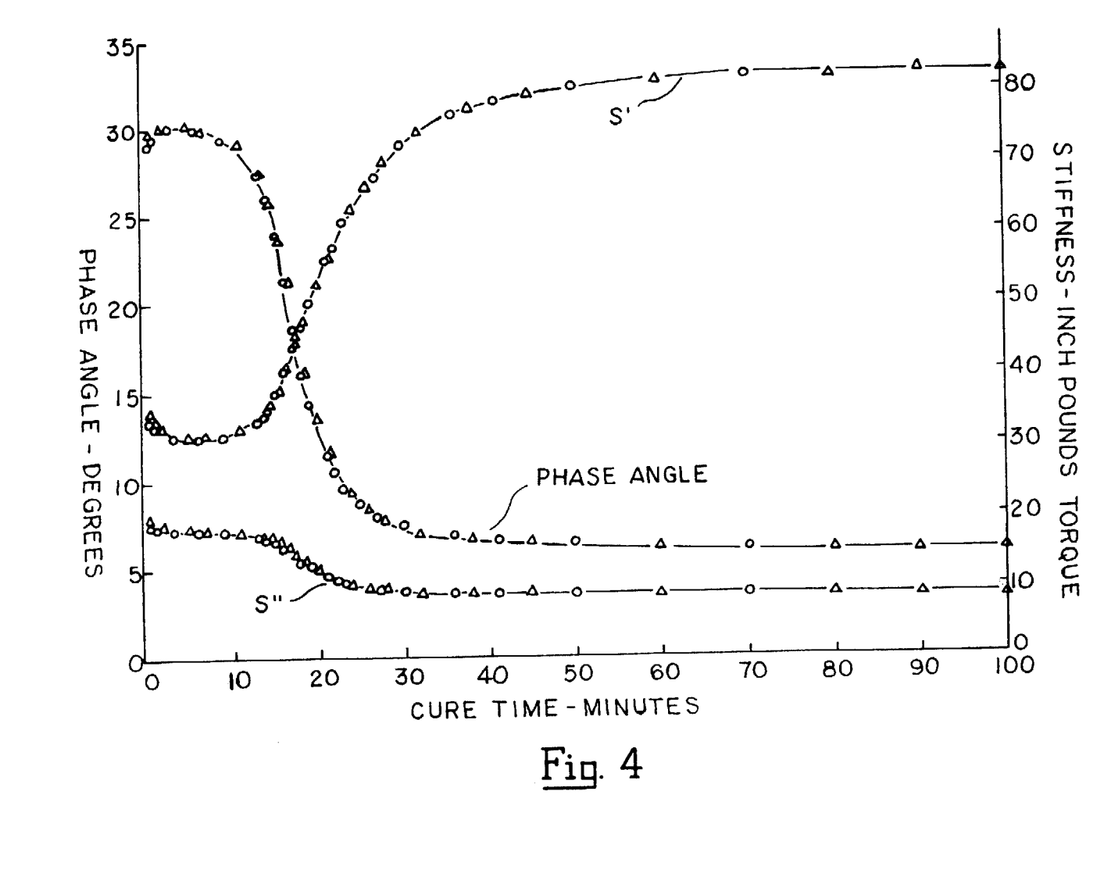
FIG. 4 is a graph which shows in-phase elastic modulus, S'; the viscous component of modulus, S'', (right-hand ordinate); and phase angle (left-hand ordinate), all plotted against cure time in minutes.

Since many of the practical applications of elastomers involve dynamic flexing, knowledge of the dynamic properties throughout vulcanization is important. Optimum values of some of the important dynamic values of a rubber specimen do not necessarily coincide with optimum cure measured by static means. By operating the rheometer at the higher frequencies and measuring both stress and strain and the phase angle between them, values for the in-phase elastic modulus and the loss modulus due to the out-phase viscous component may be calculated. FIG. 4 is a chart of the in-phase elastic modulus $S'$, the out-phase viscous component of the modulus $S''$ and the phase angle versus cure time obtained on a sulfenamide accelerated SBR tread stock vulcanized at 144°C. S' and S" are in units of inch pounds of torque and may be considered as rubber stiffness factors. Results from two independent runs are plotted on FIG. 4 and demonstrate excellent reproducibility. From the known dimensions and geometry of the oscillating disk and sample cavity it is possible to calculate the dynamic shear modulus but such calculations form no part of the present invention. Although the data presented in FIG. 4 are plotted from individual measurements of the total dynamic modulus, $S^*$, and the phase angle taken at various intervals, the phase angle and $S^*$ may be recorded continuously with some reduction in precision by means of a phase meter and alternating current recorders to give a continuous record throughout vulcanization.

Figure 5:
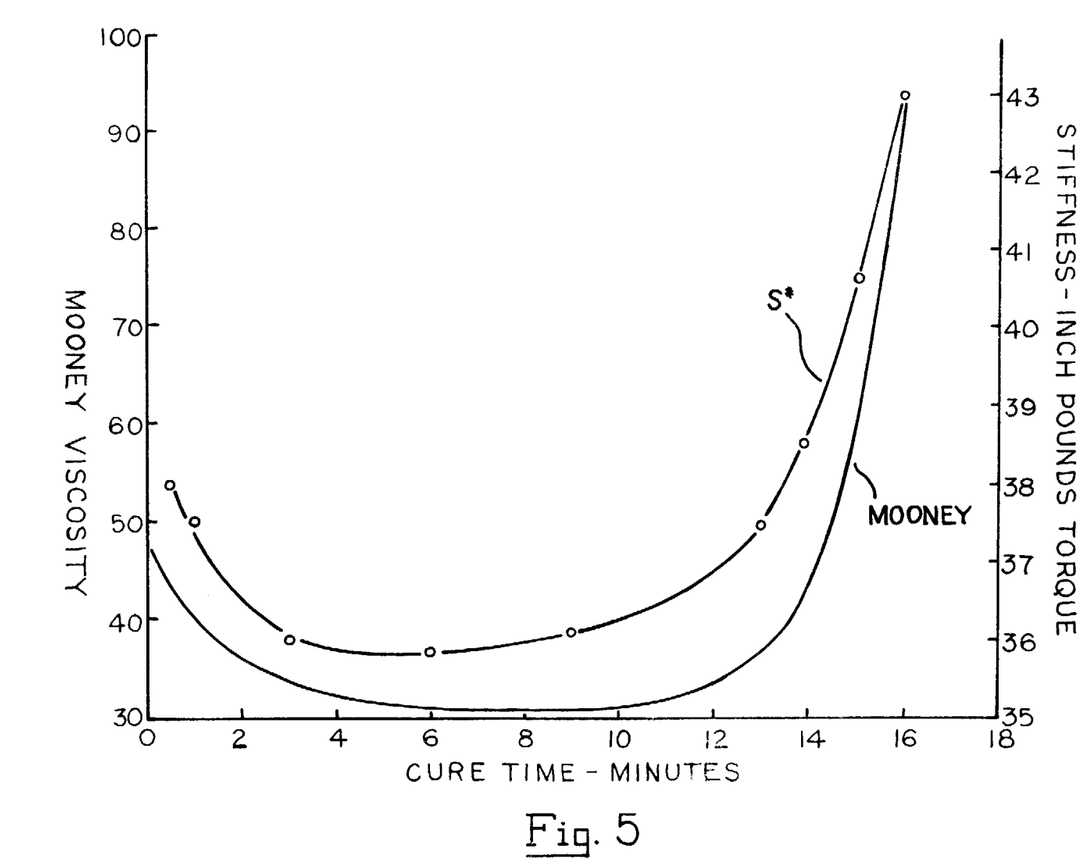
FIG. 5 is a graph which illustrates the relationship between rheometer data (complex dynamic modulus, S*) and Mooney data.

Good correlation between the Mooney viscosity curve and the rheometer curve results when the curve for the complex dynamic modulus $S^*$ is determined at the higher frequencies. FIG. 5 illustrates the relationship between the curve for complex dynamic modulus $S^*$ obtained at frequencies of 14.2 cycles/second and Mooney viscosity data.

Figure 6:
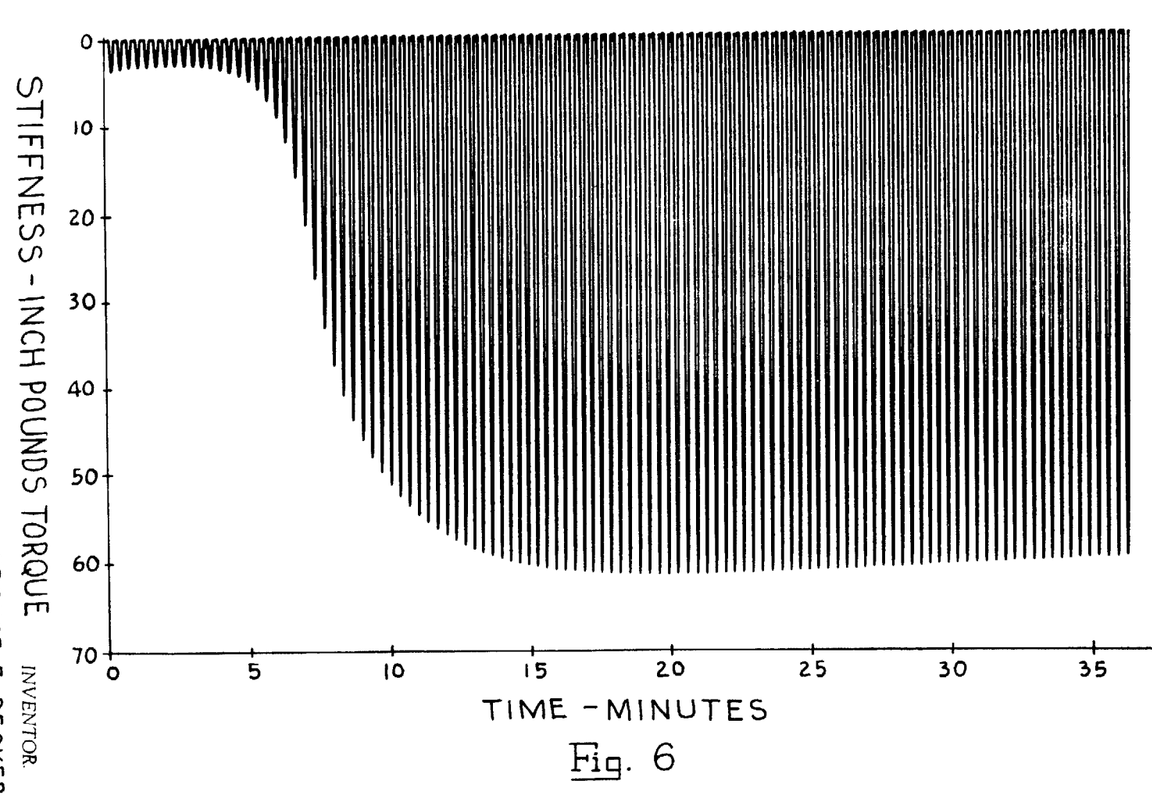
FIG. 6 is a graph which illustrates the recording of a sinusoidal stress signal made by a recorder. Rheometer stiffness is recorded against time in minutes.

As pointed out above, it is desirable to operate at low oscillating frequencies in order to minimize effect of viscosity of the elastomer when it is desired to evaluate curing characteristics of rubber. For such purpose the strain signal may be ignored and the stress signal recorded as a continuous function with time. Recording the complete sinusoidal stress signal against time provides a convenient visual representation of the progress of curing as illustrated by FIG. 6. This is an actual tracing made by a recorder using a sulfenamide accelerated natural rubber tread stock and relates inch pounds of torque to time. From such a curve it is a simple matter to pick optimum cure by simply observing the time at which stiffness reaches a maximum.

Figure 7:
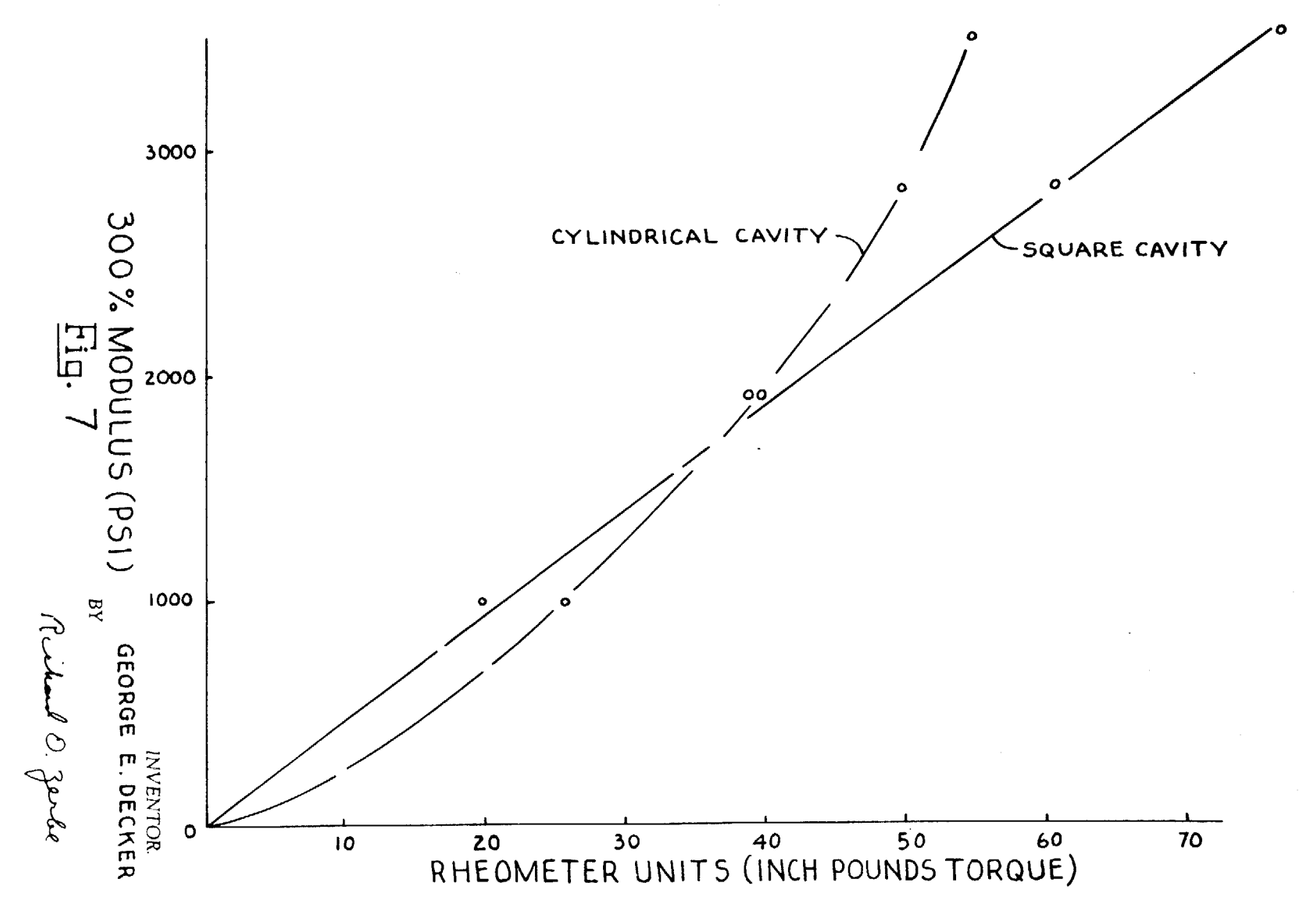
FIG. 7 is a graph wherein 300 percent modulus in pounds per square inch obtained by conventional methods is plotted against inch pounds of torque obtained with the rheometer employing a cylindrical cavity and square cavity, respectively.
Figure 8:
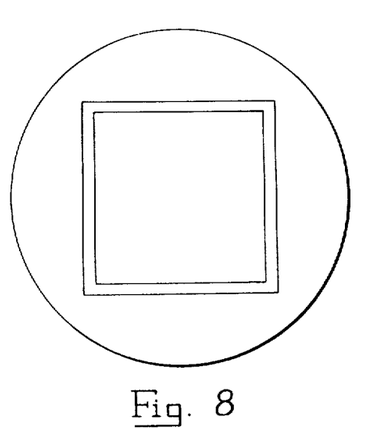
FIG. 8 is a surface view of a square die.

The importance of cavity geometry is illustrated by FIG. 7 in which 300 percent modulus is plotted against rheometer units. Rubber stocks having a wide range of modulus values up to 3,000 pounds per square inch were compounded, each point on the curves being obtained with the identical rubber stock, one sample being cured in the rheometer and another in a press. The modulus in pounds per square inch was determined by conventional means and plotted on the vertical or Y axis against rheometer units plotted on the horizontal or X axis. The same rotor was used to obtain all the rheometer data, the only variable being the cavity geometry. In one case a cylindrical cavity approximately 1¾ inches in diameter was used and in the other case a cavity with square base approximately 2 inches on each side was used as illustrated in FIG. 8. In both cases the height of each section of the cavity was approximately one-fourth inch so that the total cavity height was one-half inch. The rotor was a bi-conical rotor of the type illustrated in FIG. 1 approximately 1½ inches in diameter at the common base of the two cones. In the rheometer the stocks were cured and the optimum cure selected from the maximum on the cure curve. The rheometer units corresponding to optimum cure then related to the corresponding modulus values for optimum cure. The modulus values were obtained by heating the stocks for different periods of time in the form of sheets, dieing out dumbbell test strips and pulling the test strips on a Scott tensile tester. Optimum cure was selected and the 300 percent modulus corresponding to it plotted. The fact that the units are in different dimensions (pounds per square inch and inch pounds of torque) is of no significance because the object is only to test for linearity. It will be noted that the relationship was linear when the rheometer units were obtained by use of the non-circular test cavity but departed decidedly from linearity with the round cavity.

Figure 9:
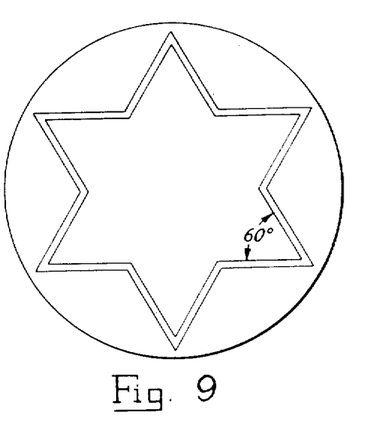
FIG. 9 is a surface view of a star die.

Although a test cavity with a square base is convenient and preferred, other shapes designed to prevent slippage are suitable, as for example elliptical, star shaped as illustrated in FIG. 9 or rectangular. In general, a test cavity in the form of any hexahedron or parallelepiped will avoid the limitations of a circular cavity. A cavity in the form of rectangular parallelepiped, also known as a cuboid, is easier to construct than some irregular shape and is for that reason preferred.

The arc through which the oscillator moves is of course a function of the strain. The angle of oscillation should not exceed that at which the test material begins to pull away from the oscillator or from the surface of the cavity to a detrimental extent. More particularly, the angle of rotation should be below that which corresponds to the ultimate elongation of the test material. The numerical limits will vary depending upon the particular test stock and the geometry of the oscillator and test chamber, but the limits can be readily determined under the particular circumstances of a given situation.

The invention has been illustrated by use of an oscillating conical disk but an oscillating cylinder or other oscillating member may be used. The conical shape is in nowise necessary for practice of the invention but it does have the advantage of simplifying calculations of dynamic modulus for reasons recorded in the literature. By use of a conical disk with similar upper and lower regions the rate of shear becomes constant. Roughened surfaces are much preferred to minimize possibility of slippage but evidence was obtained with natural and SBR rubber stocks using a smooth disk oscillating in a rubber sample contained in a smooth surfaced die that no slipping occurred. The surfaces may be roughened by cross-hatching. Cross-hatches of 1/32 inch squares 0.015 inch deep are convenient. Alternatively, radial "V" grooves may be inserted into the disk. Where calculations derived from the data are not required the geometry of the oscillating member is unimportant.

The rheometer can be used to evaluate the rheological properties of unvulcanized elastomers. The viscosities of some elastomers and carbon black masterbatches are too great to be determined by instruments currently available, as for example the Mooney viscometer. The present instrument overcomes this difficulty. Indeed, the rheological properties of any of the elastomers may be evaluated.

It is intended to cover all changes and modifications of the examples of the invention herein chosen for purposes of disclosure which do not constitute departures from the spirit and scope of the invention.

The embodiments of the invention in which an exclusive property or privilege is claimed are defined as follows:

1. A measuring apparatus comprising test material enclosing means which include a non-circular chamber the base of which is star shaped or rectangular, an oscillatory disk within the chamber in fixed relative position with clearance therebetween to provide a volume of test material which cannot rotate, means for maintaining the test material under pressure in the chamber, means for rotatively oscillating the disk therein and a stress transducer to measure torque required to oscillate the disk.

2. In a measuring apparatus an oscillator, drive means connected to the oscillator, relatively movable stator sections closing about said oscillator in fixed cuboid relation thereto defining a cuboid test material enclosure, means for maintaining the test material under continuous confining pressure in the enclosure, force means connected to the drive means to mechanically oscillate the oscillator and impose oscillating shearing force on the test material and means to measure the force required for oscillation.

3. A measuring apparatus comprising test material enclosing means which include a cuboid chamber, an oscillatory disk within the chamber in fixed relative position with clearance therebetween to provide enclosed volume of test material, means for maintaining the test material under pressure in the chamber, means for rotatively oscillating the disk therein and a stress transducer to measure torque required to oscillate the disk.

4. Apparatus for measuring loss angle of an elastomer which comprises means for subjecting a volume of elastomer under pressure to shearing stress imparted by an oscillator embedded within the elastomer, means for measuring the torque required to move the oscillator, means for simultaneously therewith measuring the displacement of the oscillator, means for converting torque and displacement into electrical signals and a calibrated resistance-capacitance phase shift network for measuring the shift in phase required to bring the torque signal into phase with the displacement signal by varying the resistance thereof until the torque and displacement signals are in phase.

5. Apparatus for measuring the loss angle of an elastomer which comprises means for subjecting a fixed volume of elastomer to shearing stress imparted by an oscillator embedded within the elastomer, means for transducing the torque required to move the oscillator into an electrical signal, means for simultaneously therewith transducing the displacement of the oscillator into an electrical signal, means for amplifying both the torque and displacement signals, a resistance-capacitance phase-shift network, means for displaying the amplified displacement signal and means for adjusting the phase-shift network to maintain a straight line on the display means.

6. Method of measuring the rheological properties of solid elastomeric material which comprises enclosing a sample of the material under pressure in a non-circular chamber the base of which is star shaped or rectangular while subjecting the enclosed material to rotary oscillating shearing stress through an angle of rotation below that corresponding to the ultimate elongation of the test material and measuring the torque required to move the oscillator.

7. The method of claim 6 wherein the chamber in which the elastomeric material is enclosed is cuboid and the shearing stress is applied by an oscillator embedded within the material.

8. Method of determining the curing characteristics of solid elastomeric material which comprises curing a sample of the material enclosed under pressure in a cuboid chamber about 2 inches on each side and about 0.5 inch high while subjecting the enclosed material to rotary oscillating shearing stress by an oscillating disk of about 1.5 inch diameter embedded within the material of low frequency such that effect of the viscous component of the elastomer is minimized and through an angle of rotation below that corresponding to the ultimate elongation of the material and measuring the torque required to oscillate the disk.

9. Method of measuring the dynamic properties of solid elastomeric material which comprises curing a sample of the material enclosed under pressure in a cuboid chamber while subjecting the enclosed material to rotary oscillating shearing stress by an oscillating disk embedded within the material oscillating at high frequency to provide measurable difference in phase between stress and displacement and through an angle of rotation below that corresponding to the ultimate elongation of the material, measuring the torque required to oscillate the disk, simultaneously measuring displacement of the disk and determining phase angle or a component of torque.

10. Method of measuring the dynamic properties of solid vulcanizable elastomeric material during vulcanization thereof which comprises enclosing a sample of the material under pressure in a chamber, subjecting the enclosed material to vulcanizing conditions and during the vulcanization to rotary oscillating shearing stress at high frequency to provide measurable differences in phase between stress and displacement and through an angle of rotation below that corresponding to the ultimate elongation of the material, measuring the torque required to impose the shearing stress, simultaneously measuring displacement and determining phase angle or a component of torque.

11. The method of claim 10 wherein the frequency is about 852 cycles per minute.

* * * * *